United States Patent [19]
Lockshaw et al.

[11] Patent Number: 5,273,806
[45] Date of Patent: Dec. 28, 1993

[54] STRUCTURAL ELEMENT WITH INTERLOCKING RIBBING

[76] Inventors: James J. Lockshaw, 16522 Wanderer La., Huntington Beach, Calif. 92649; Stephen R. Kelly, 24692 Via Buena, Yorba Linda, Calif. 92687; Randall B. Walker, 20432 Santa Ana Ave., #17, Santa Ana Heights, Calif. 92707; John Kaiser, Jr., 20592 Minerva La., Huntington Beach, Calif. 92707

[21] Appl. No.: 771,009

[22] Filed: Oct. 3, 1991

[51] Int. Cl.⁵ .............................................. B32B 3/28
[52] U.S. Cl. ....................................... 428/167; 428/53; 428/120; 428/166; 428/172; 428/178; 52/806
[58] Field of Search ................. 428/178, 119, 120, 33, 428/156, 166, 172, 188, 167, 53, 101, 99; 52/273, 284, 785, 593, 806

[56] References Cited

U.S. PATENT DOCUMENTS 4,957,788  9/1990  Colonel ............................ 428/33

*Primary Examiner*—Donald J. Loney
*Attorney, Agent, or Firm*—Louis J. Bachand

[57] ABSTRACT

A structural element comprising opposed first and second, laterally and longitudinally extended, generally planar surface structures each having a closed figure pattern of ribbing projecting therefrom toward the opposite surface structure, the ribbing being of respective heights to bridge the space between the surface structures, the opposed ribbing being interlocked in registered, mating relation.

3 Claims, 1 Drawing Sheet

STRUCTURAL ELEMENT WITH INTERLOCKING RIBBING

FIELD OF THE INVENTION

This invention relates to structural elements, ranging from aircraft components to enclosures, which are lightweight, extremely strong, widely variable in size, configuration and material of construction, easy to manufacture with widely available equipment, and free of the problems associated with other forms of structural elements serving some of the same purposes, such as honeycomb panels.

BACKGROUND

Aircraft components including engine intake ducts, flooring and wing sections are frequently made of honeycomb material which is lightweight, rigid and capable of being fabricated in many shapes. Honeycomb is, however, expensive, difficult to work with, problematic when contour changes are required, awkward to attach other parts to, and not readily repairable. These drawbacks to honeycomb structural elements have been met by reinforcing the element where other parts are to be mounted, by adding brackets at junctions of internal members and, in general, beefing up the structural element, all at the cost of increasing its weight, thus lessening the most significant advantage of the honeycomb in the first place.

SUMMARY OF THE INVENTION

It is an object, therefore, of the present invention to provide a structural element which affords the advantages of honeycomb but avoids the disadvantages. It is another object to provide a structural element which is widely variable is size and contour with no great change in manufacturing complexity or cost, which is lightweight while offering great strength, which is readily repaired, and which affords easy attachment of other components with no special post manufacturing steps.

These and other objects of the invention, to become apparent hereinafter, are realized in a structural element comprising opposed first and second, laterally and longitudinally extended, generally planar surface structures each having a closed figure pattern of ribbing projecting therefrom toward the opposite surface structure, the ribbing being of respective heights to bridge the space between the surface structures, the opposed ribbing being interlocked in registered, mating relation.

In particular embodiments: The first of the surface structures defines a ribbing projection of relatively greater height, and the second of the surface structures defines a ribbing projection of relatively lesser height; and, The second surface structure ribbing defines an outward edge groove into which the opposing outward edge of the first surface structure ribbing interfits in structural element defining relation.

The invention further contemplates the method of supporting opposed surface structures in a structural element including extending ribbing from each surface structure in a closed figure, mutually registerable pattern, and interconnecting the ribbing at their junction between the surface structures by interfitting the opposed patterns of ribbing in tongue and groove relation.

BRIEF DESCRIPTION OF THE DRAWING

The invention will be further described in conjunction with the accompanying drawing wherein.

PREFERRED MODES

Figure 1:
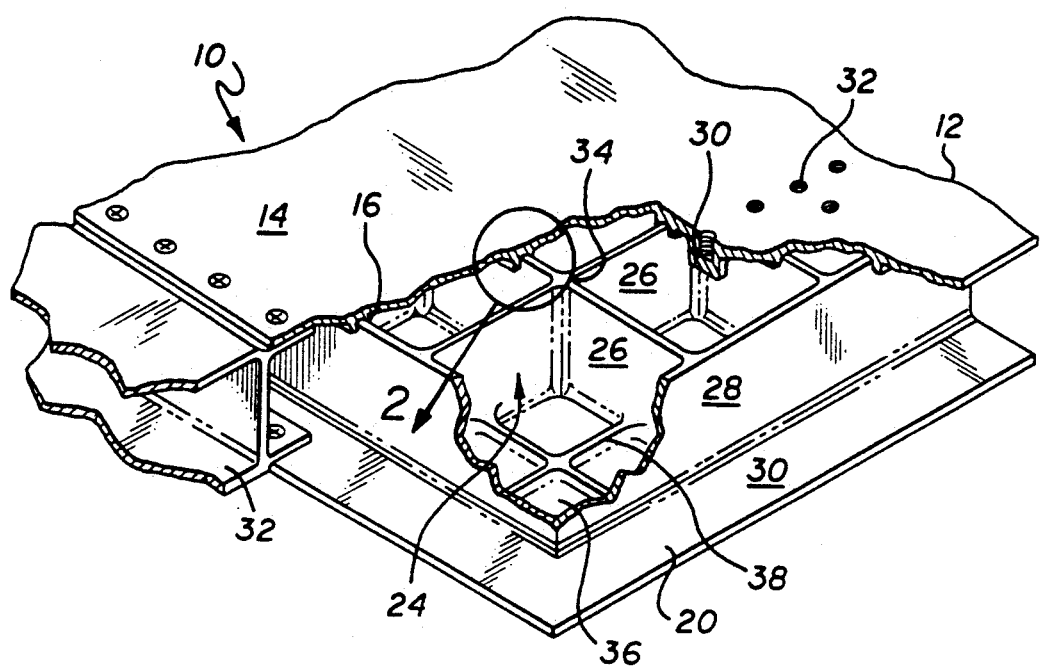
FIG. 1 is an isometric view of the structural element according to the invention; and, FIG. 2 is a detail view thereof, somewhat enlarged, taken on line 2—2 in FIG. 1.

With reference to the drawing, in FIG. 1 a structural element 10 is shown comprising a first or upper surface structure 12 comprising a generally planar surface portion 14 and machined thereinto from a unitary metal mass an integral pattern of ribbing 16 arranged in a series of closed FIGS. 18. The element 10 further comprises a second or lower surface structure 20 comprising a generally planar surface portion 22 and machined thereinto from a unitary metal mass an integral pattern of ribbing 24 arranged in a series of closed FIGS. 26. The outermost portion of the ribbing forms an enclosing wall 28. The position of wall 28 is such that a perimetrical flange 30 is defined to which other components and parts 32 can be securely mounted without reinforcement of the structural element 10. Materials used include metals such as aluminum and titanium or other metals, and composites of fibers, fillers and resins which have suitable strength and machining characteristics.

It will be noted that the respective heights of the upper ribbing 16 and the lower ribbing 24 are different and such that together they bridge the distance by which the surface portions 14 and 20 are spaced. The upper surface structure 12 has essentially a minor rib 16 extended in a manner to register and mate with the substantially taller ribbing 24. In addition, the upper surface structure 12 has integrally formed bosses 30 into which bolt holes 32 are tapped for securing the structural element to other components or vice versa. It is to be noted that provision of the bosses does not require added bolt-on parts as in honeycomb, but these features may be added wherever desired within the capability of the machining apparatus.

Further, the separation of surface structures 12, 20, may be varied by changing the height of the ribbing 16, 24, to provide a tapered or stepped structural element.

Desirably in manufacturing, the machining is accomplished to leave relatively more material at the junctions 34 of the closed FIGS. 26, to provide increased compressive strength. Also the interior surface 36 of the surface structure 20 is suitable machined out to reduce material and thus weight and at the same time add rigidity because of the resulting raised rib 38 which results.

Figure 2:
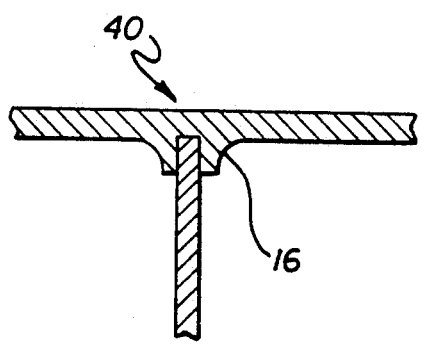

The interconnection of the first and second surface structures is preferably by a tongue and groove arrangement 40, shown best in FIG. 2. Other interfitting/interlocking arrangements can be used, including single sided grooves mated with tongues, and male edges mated with female or forked tongues. The interlocked ribbing 16, 24 is suitable secured with glues, such as epoxy or urethane glues, and/or mechanically interlocked.

We claim:

1. Structural element comprising opposed first and second, laterally and longitudinally extended, generally planar surface structures each having a closed figure pattern of ribbing projecting therefrom toward the opposite surface structure, said ribbing being of respective heights to bridge the space between said surface structures, said opposed ribbing being interlocked in registered, mating relation.

2. Structural element according to claim 1, in which the first of said surface structures defines a ribbing projection of relatively greater height, and the second of said surface structures defines a ribbing projection of relatively lesser height.

3. Structural element according to claim 2, in which said second surface structure ribbing defines an outward edge groove into which the opposing outward edge of the first surface structure ribbing interfits in structural element defining relation.

* * * * *